United States Patent
Taguchi et al.

(10) Patent No.: US 8,498,081 B2
(45) Date of Patent: Jul. 30, 2013

(54) PERPENDICULAR MAGNETIC RECORDING MEDIUM INCLUDING SOFT-MAGNETIC-PARTICLES-MIXED PROTECTIVE LAYER ON TOP OF RECORDING LAYER AND MAGNETIC DISK DEVICE HAVING THE SAME

(75) Inventors: Tomoko Taguchi, Kunitachi (JP); Hiroyuki Hyodo, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/404,805

(22) Filed: Feb. 24, 2012

(65) Prior Publication Data

US 2012/0243122 A1  Sep. 27, 2012

(30) Foreign Application Priority Data

Mar. 24, 2011  (JP) .................................. 2011-065287

(51) Int. Cl.
*G11B 5/82* (2006.01)
(52) U.S. Cl.
USPC ........................................................ 360/135
(58) Field of Classification Search
USPC ..................... 360/125.03, 135; 428/827, 829, 428/831.2
See application file for complete search history.

(56) References Cited

U.S. PATENT DOCUMENTS

| 7,611,783 | B2 | 11/2009 | Inamura et al. |
| 8,000,060 | B2 * | 8/2011 | Zhang et al. .................. 360/135 |
| 2003/0104247 | A1 * | 6/2003 | Girt ............................... 428/693 |
| 2006/0166039 | A1 * | 7/2006 | Berger et al. ............... 428/828.1 |
| 2006/0177703 | A1 * | 8/2006 | Takenoiri et al. ............. 428/829 |
| 2006/0177704 | A1 * | 8/2006 | Berger et al. ................ 428/829 |
| 2006/0222901 | A1 * | 10/2006 | Inamura et al. .............. 428/827 |
| 2007/0217071 | A1 * | 9/2007 | Inamura et al. .............. 360/135 |

FOREIGN PATENT DOCUMENTS

| JP | 09-016940 | 1/1997 |
| JP | 2006-190487 | 7/2006 |
| JP | 2006-309922 | 11/2006 |

* cited by examiner

*Primary Examiner* — Angel Castro
(74) *Attorney, Agent, or Firm* — Patterson & Sheridan LLP

(57) ABSTRACT

According to one embodiment, a perpendicular magnetic recording medium characterized by includes: a substrate; an undercoat layer formed on the substrate and made of a soft magnetic material; a recording layer formed on the undercoat layer and having an easy axis of magnetization in a direction that is approximately perpendicular to a surface of the perpendicular magnetic recording medium; and a protective layer which is formed on the recording layer and in which soft magnetic particles are mixed.

6 Claims, 6 Drawing Sheets

PERPENDICULAR MAGNETIC RECORDING MEDIUM INCLUDING SOFT-MAGNETIC-PARTICLES-MIXED PROTECTIVE LAYER ON TOP OF RECORDING LAYER AND MAGNETIC DISK DEVICE HAVING THE SAME

CROSS REFERENCE TO RELATED APPLICATION(S)

The application is based upon and claims the benefit of priority from Japanese Patent Application No. 2011-065287 filed on Mar. 24, 2011, the entire contents of which are incorporated herein by reference.

BACKGROUND

1. Field

The present invention relates to a perpendicular magnetic recording medium and a magnetic disk device having it.

2. Description of the Related Art

In recent years, with the increase in the track density of hard disk drives (HDDs), recording heads have come to form narrower tracks. However, where such a narrow-track recording head is used, the intensity of a recording magnetic field generated by the tip of the recording head may be made so low that recording magnetization having a sufficiently high S/N ratio (signal/noise ratio) cannot be written on a medium.

To increase the intensity of a recording magnetic field, it has been attempted to set the recording head closer to the medium. However, there is a technical problem that if the recording head comes too close to the medium, devices in the HDD suffer physical deterioration because of contamination that is caused by frictional wear of the recording head and the medium.

To solve the above problem, a magnetic recording medium has been proposed which is provided with a main recording layer having such perpendicular magnetic anisotropy that the anisotropic magnetic field strength is $H_{k1}$ and the inclination of a magnetization curve at an inversion point is $\alpha_1$ and a writing assistance layer which is formed so as to be in contact with the main recording layer from above or below and whose anisotropic magnetic field strength is $H_{k2}$ and inclination of a magnetization curve at an inversion point is $\alpha_2$, wherein relationships $H_{k2} < H_{k1}$ and $\alpha_2 > \alpha_1$ are satisfied.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, a perpendicular magnetic recording medium characterized by includes: a substrate; an undercoat layer formed on the substrate and made of a soft magnetic material; a recording layer formed on the undercoat layer and having an easy axis of magnetization in a direction that is approximately perpendicular to a surface of the perpendicular magnetic recording medium; and a protective layer which is formed on the recording layer and in which soft magnetic particles are mixed.

Hard disk drives (example magnetic disk devices; hereinafter referred to as HDDs) according to embodiments of the present invention will be hereinafter described in detail with reference to the drawings.

Embodiment 1

Figure 1:
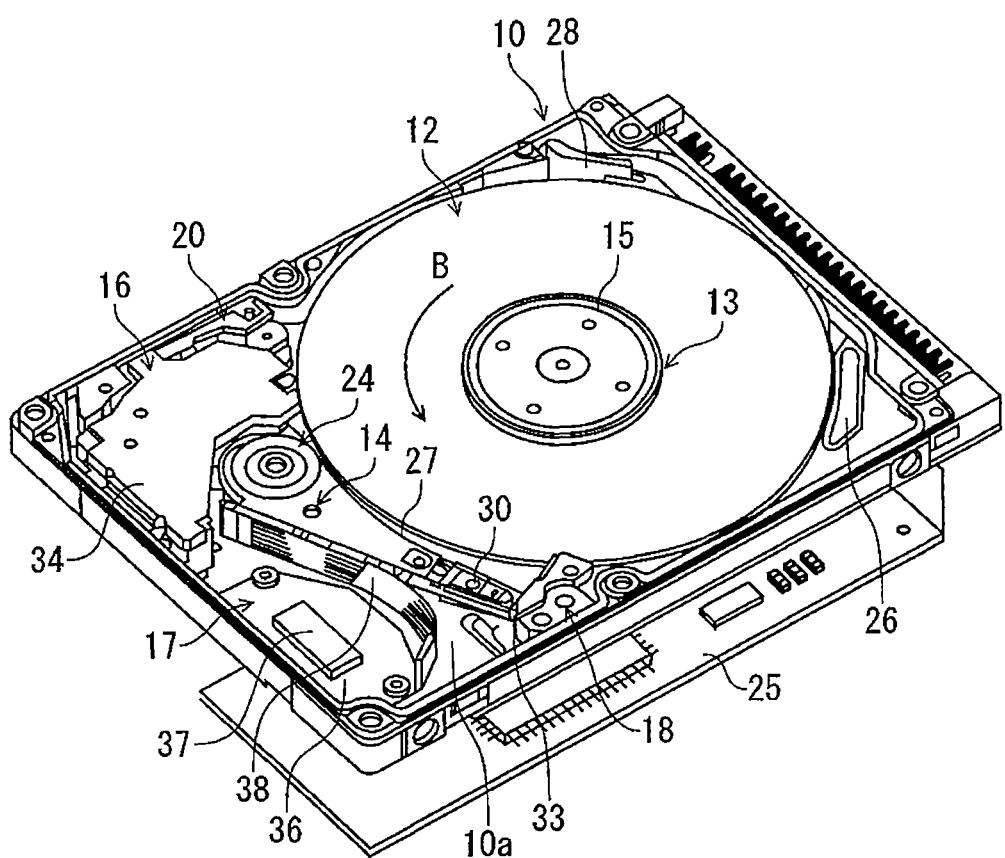
FIG. 1 is a perspective view of an HDD according to a first embodiment.
Figure 2:
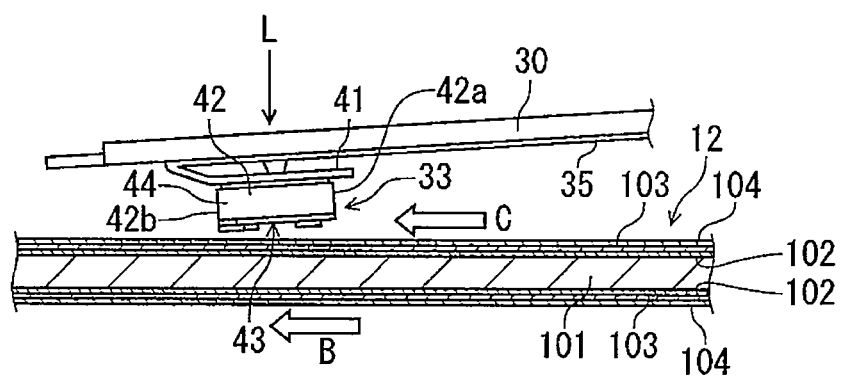
FIG. 2 is a side view showing a magnetic head and a suspension of the HDD of FIG. 1.

FIG. 1 shows the internal structure of an HDD according to a first embodiment with its top cover removed. FIG. 2 shows a magnetic head in a flying state. As shown in FIG. 1, the HDD is equipped with a cabinet 10, which a base 10a shaped like a rectangular box having an open top and a rectangular-plate-like top cover (not shown). The top cover is screwed to the base 10a with plural screws and thereby closes the top opening of the base 10a. As a result, the inside of the cabinet 10 is kept air-tight and can exchange air with the outside only through a breathing filter 26.

A magnetic disk 12 (recording medium) and mechanism components are provided on the base 10a The mechanism components include a spindle motor 13 which supports and rotates the magnetic disk 12, plural (e.g., two) magnetic heads 33 which record and reproduce information on and from the magnetic disk 12, a head actuator 14 which supports the magnetic heads 33 in such a manner that they are movable with respect to the surfaces of the magnetic disk 12, and a voice coil motor (hereinafter referred to as VON) 16 which rotates and positions the head actuator 14. A ramp loading mechanism 18 which holds, at a position that is spaced from the magnetic disk 12, the magnetic heads 33 when they have been moved to the outer periphery of the magnetic disk 12, a latch mechanism 20 which holds the head actuator 14 at an escape position when the HDD has received impact or the like, and a board unit 17 which is mounted with electronic components such as a preamplifier 37 and a head IC are also provided on the base 10a.

A control circuit board 25 is screwed to the outer bottom surface of the base 10a so as to be opposed to the latter. The control circuit board 25 controls operations of the spindle motor 13, the VCM 16, and the magnetic heads 33 via the board unit 17.

As shown in FIG. 1, the magnetic disk 12 is fitted with the hub of the spindle motor 13 concentrically, and is clamped by a clamp spring 15 screwed to the top end of the hub and is thereby fixed to the hub. The magnetic disk 12 is rotationally driven by the spindle motor 13 (drive motor) in the direction indicated by arrow B at a prescribed speed.

The head actuator 14 is equipped with a bearing unit 24 which is fixed to the bottom wall of the base 10a and plural arms 27 which extend from the bearing unit 24. The arms 27 are spaced from each other by a prescribed interval and extend in the same direction from the bearing unit 24 parallel with the surfaces of the magnetic disk 12. The head actuator 14 is equipped with suspensions 30 each of which is elastically deformable and is shaped like a long and narrow plate.

Each suspension 30, which is a leaf spring, extends from the corresponding arm 27 with its proximal end portion spot-welded or bonded to the tip portion of the arm 27. Each suspension 30 may be integral with the corresponding arm 27. A magnetic head 33 is supported by the distal end portion of each suspension 30. Each set of an arm 27 and a suspension 30 constitutes a head suspension, and each set of a head suspension and a magnetic head 33 constitutes a head suspension assembly.

As shown in FIG. 2, each magnetic head 33 has a slider 42 which is approximately shaped like a rectangular parallelepiped and a recording/reproduction head portion 44 which is located at the trailing end of the slider 42. Each magnetic head 33 is fixed to a gimbal spring 41 which is attached to the tip portion of the suspension 30. Because of the elasticity of the suspension 30, a lead load L is imposed on each magnetic head 33 toward the surface of the magnetic disk 12. The two arms 27 are spaced from each other by the prescribed interval and extend parallel with each other, and the suspensions 30 and the magnetic heads 33 which are attached to the respective arms 27 are opposed to each other with the magnetic disk 12 interposed in between.

Each magnetic head 33 is electrically connected to a main flexible printed circuit board (hereinafter referred to as FPC) 38 (described below) via a relay FPC 35 which is fixed to the suspension 30 and the arm 27.

As shown in FIG. 1, the board unit 17 has an FPC main body 36 and the main FPC 38 which extends from the FPC main body 36. The FPC main body 36 is fixed to the bottom wall of the base 10a. The FPC main body 36 is mounted with electronic components such as a preamplifier 37 and a head IC. The distal end of the main FPC 38 is connected to the head actuator 14 and connected to the magnetic heads 33 via the respective relay FPCs 35.

The VCM 16 has a support frame (not shown) which extends from the bearing unit 24 in the direction that is opposite to the extension direction of the arms 27 and a voice coil which is supported by the support frame. In a state that the head actuator 14 is incorporated in the base 10a, the voice coil is located between a pair of yokes 34 which are fixed to the base 10a. The voice coil, the yokes 34, and a magnet that is fixed to the yokes 34 constitute the VCM 16.

When the voice coil of the VCM 16 is energized in a state that the magnetic disk 12 is being rotated, the head actuator 14 is swung and the magnetic heads 33 are moved to and positioned with respect to a desired track of the magnetic disk 12. During that course, the magnetic heads 33 are moved in the radial direction of the magnetic disk 12 between its inner periphery and outer periphery.

Next, the structures of the magnetic disk 12 and each magnetic head 33 will be described in detail.

Figure 3:
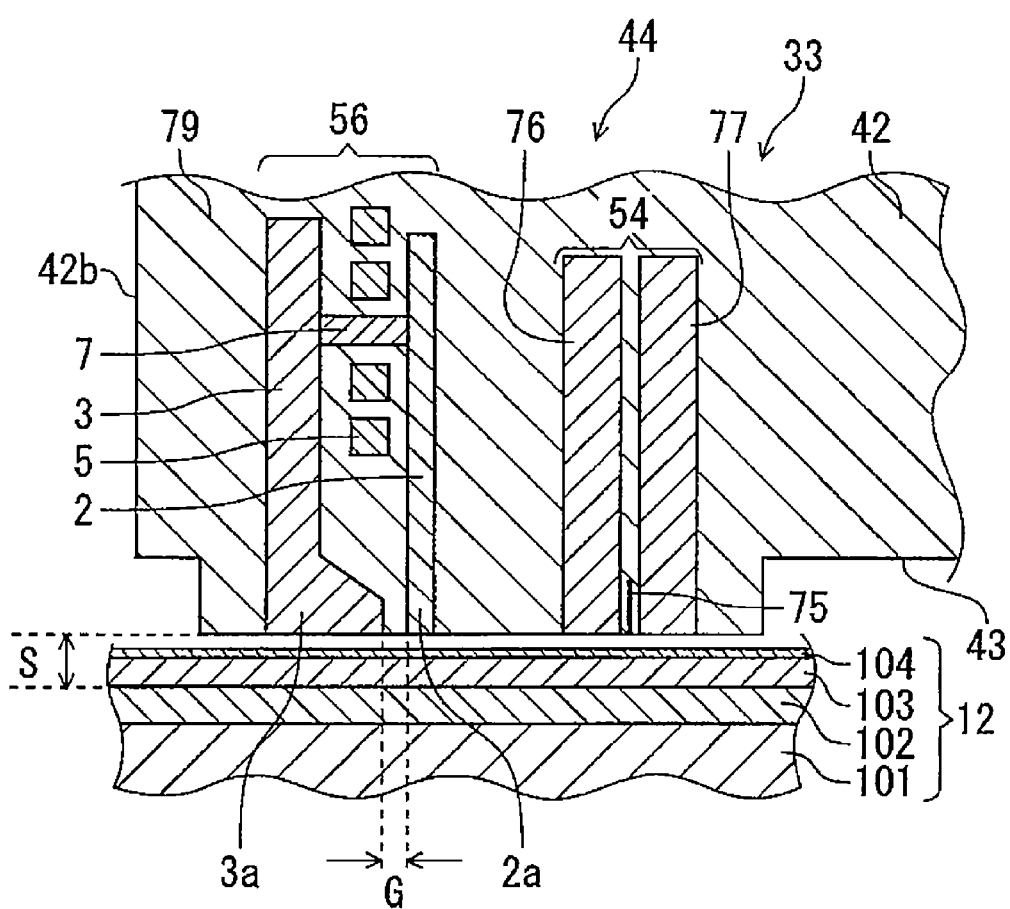
FIG. 3 is an enlarged sectional view of a head portion of the magnetic head and part of a magnetic disk of the HDD of FIG. 1.

FIG. 3 is an enlarged sectional view of the head portion 44 of a magnetic head 33 and part of the magnetic disk 12.

The magnetic disk 12 according to the embodiment is a vertical two-layer film medium in which a soft magnetic layer 102 is formed on a substrate 101, a perpendicular recording layer 103 having such magnetic anisotropy that magnetic moment tends to be directed to the direction that is perpendicular to the disk surface is formed on the soft magnetic layer 102, and a non-magnetic layer 104 (protective film) mixed with soft magnetic fine particles is formed on the perpendicular recording layer 103. The magnetic head 33 is a recording/reproduction separation type magnetic head in which a recording head 56 and a reproduction head 54 are separated from each other. The recording head 56 is composed of a main magnetic pole 2 made of a high permeability material; a return yoke which is formed by a return magnetic pole 3 provided on the trailing side of the main magnetic pole 2 to efficiently close the magnetic path via the portion, right under the main magnetic pole 2, of the soft magnetic layer 102, a return shield 3a which is joined to the tip portion of the return magnetic pole 3, and a joining portion 7 disposed on the side that is opposite to the surface of the magnetic disk 12; and a coil 5 which is wound around a magnetic core including the main magnetic pole 2 and the return yoke to cause magnetic flux to flow through the main magnetic pole 2.

The reproduction head 54 is composed of a magnetic film 75 which exhibits a magnetoresistive effect and a first shield 76 and a second shield 77 which are made of a high permeability material and disposed on both sides of the magnetic film 75 in the head running direction.

To increase the resolution of recording on the portion, in the vicinity of the trailing end of the main magnetic pole 2, of the magnetic disk 12, the distance G between the main magnetic pole 2 and the return shield 3a of the recording head 56 is set shorter than the distance S between the ABS (air-bearing-slider) surface of the magnetic head 33 and the surface of the soft magnetic layer 102 of the magnetic disk 12.

Conventional perpendicular recording type HDDs in which the distance G is shorter than the distance S have the following problem. The magnetic flux that flows from the main magnetic pole 2 to the return shield 3a is increased, and hence the magnetic flux that flows from the tip 2a of the main magnetic pole 2 into the soft magnetic layer 102 is decreased. As a result, a sufficiently strong magnetic field cannot be applied to the perpendicular recording layer 103 to render the overwrite (OW) ability insufficient. The embodiment can solve this problem of insufficient magnetic field strength. That is, since the soft-magnetic-particles-mixed layer 104 is formed on the recording layer 103, the maximum head magnetic field strength at the time of recording which determines the overwrite ability can be increased.

Figure 4A:
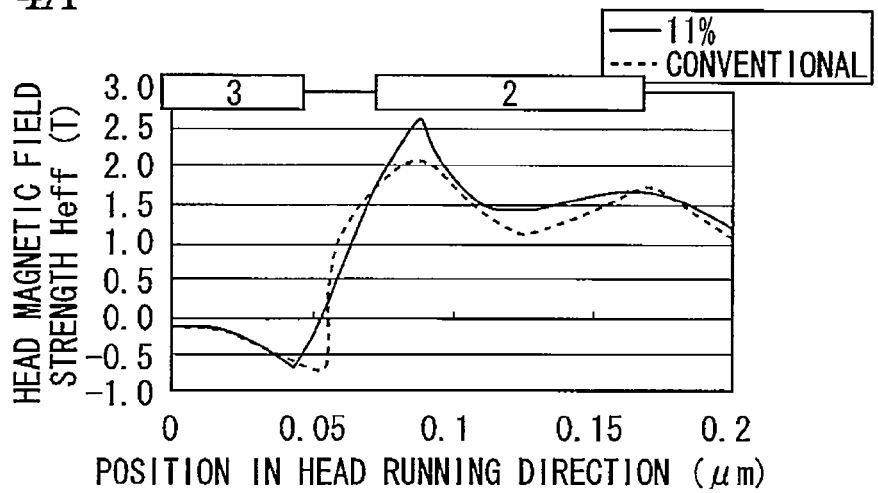
FIG. 4A is a graph showing an advantage of the first embodiment in terms of the recording magnetic field strength.
Figure 4B:
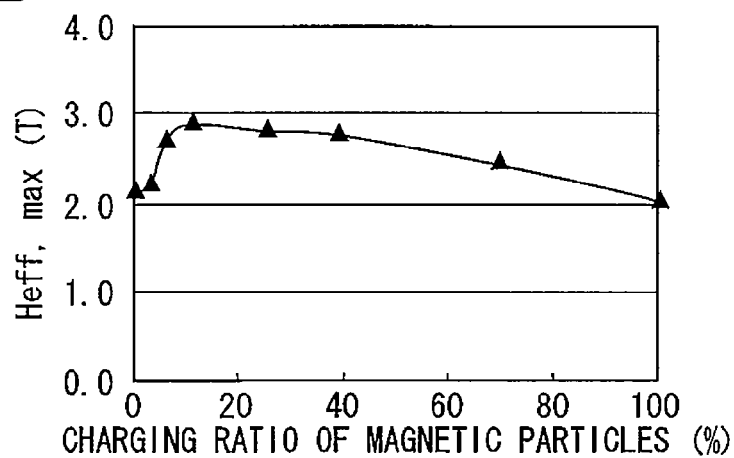
FIG. 4B is a characteristic diagram of the first embodiment showing a relationship between the recording magnetic field strength and the magnetic particles charging ratio.
Figure 4C:
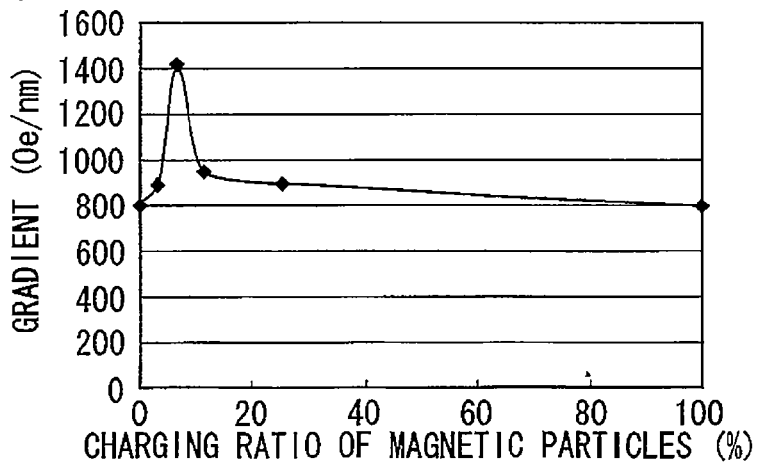
FIG. 4C is a characteristic diagram of the first embodiment showing a relationship between the recording magnetic field gradient and the magnetic particles charging ratio.

The characteristics of the HDD according to the embodiment will be described below in detail with reference to FIGS. 4A-4C. FIG. 4A is a graph showing an advantage of the embodiment. FIG. 4B is a first characteristic diagram of the embodiment showing a relationship between the recording magnetic field strength and the magnetic particles charging ratio. FIG. 4C is a second characteristic diagram of the embodiment showing a relationship between the recording magnetic field gradient and the magnetic particles charging ratio.

FIG. 4A compares a head magnetic field strength distribution in the head running direction around a track center in a case that the charging ratio of soft magnetic particles in the non-magnetic layer 104 (protective film) is 11% (embodiment; thick line) with a head magnetic field strength distribution on a conventional magnetic disk (broken line).

The positional relationship between the magnetic field strength distribution and the main magnetic pole 2 and the return shield 3 is also shown in FIG. 4A. It is seen that in the embodiment the maximum magnetic field strength in the vicinity of the trailing end of the main magnetic pole 2 is about 25% higher than in the conventional example.

FIG. 4B shows the relationship between the recording maximum magnetic field strength and the charging ratio of soft magnetic particles in the non-magnetic layer 104 (protective film) in the embodiment. It is seen that the maximum magnetic field strength increases steeply from a charging ratio 0% (conventional) to a charging ratio about 10%. The maximum magnetic field strength is approximately constant between the charging ratio about 10% to a charging ratio 40%. Then, the maximum magnetic field strength decreases gradually as the charging ratio increases. The maximum magnetic field strength at a charging ratio 100% (i.e., the protective film 104 is totally a soft magnetic film) is approximately as low as that at the charging ratio 0%.

FIG. 4C shows the relationship between the magnetic field gradient at the trailing end of the main magnetic pole 2 and the charging ratio of soft magnetic particles in the non-magnetic layer 104 (protective film) in the embodiment.

It is seen that the magnetic field gradient is increased around a magnetic filling ratio 10%. The recording resolution also has a peak there.

In summary, the maximum magnetic field strength or the magnetic field gradient can be increased and hence a high line density can be realized by forming the non-magnetic layer 104 which is mixed with soft magnetic particles at a charging ratio of 40% or less.

Figure 5:
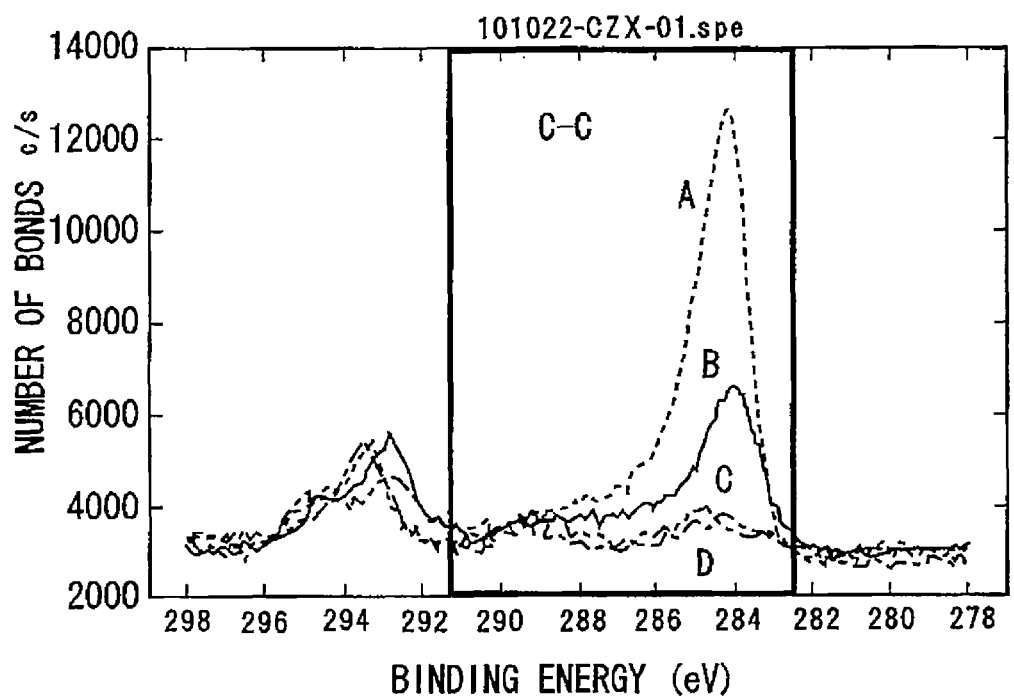
FIG. 5 is a graph showing the bonding strength between carbon atoms in protective films of the first embodiment and comparative examples.

FIG. 5 shows results of experiments in which the bonding strength between carbon (C) atoms in protective films 104 formed by mixing cobalt-zirconium-niobium (CoZrNb) particles into a carbon film (non-magnetic film) was examined.

In FIG. 5, a broken-line curve A represents the bonding strength of a conventional example and a solid-line curve B represents the bonding strength of the embodiment with a charging ratio 30%. Broken-line curves C and D represent the bonding strength of comparative examples with charging ratios 60% and 80%, respectively.

It is seen that the bonding strength between carbon atoms is low when the charging ratio is higher than or equal to 60%. Where the bonding strength between carbon atoms in the protective film 104 is low, there is risk that the device is destroyed due to contact between the magnetic heads 33 and the magnetic disk 12. To eliminate the risk of destruction, it is preferable that the charging ratio be smaller than or equal to 30%.

Embodiment 2

Figure 6:
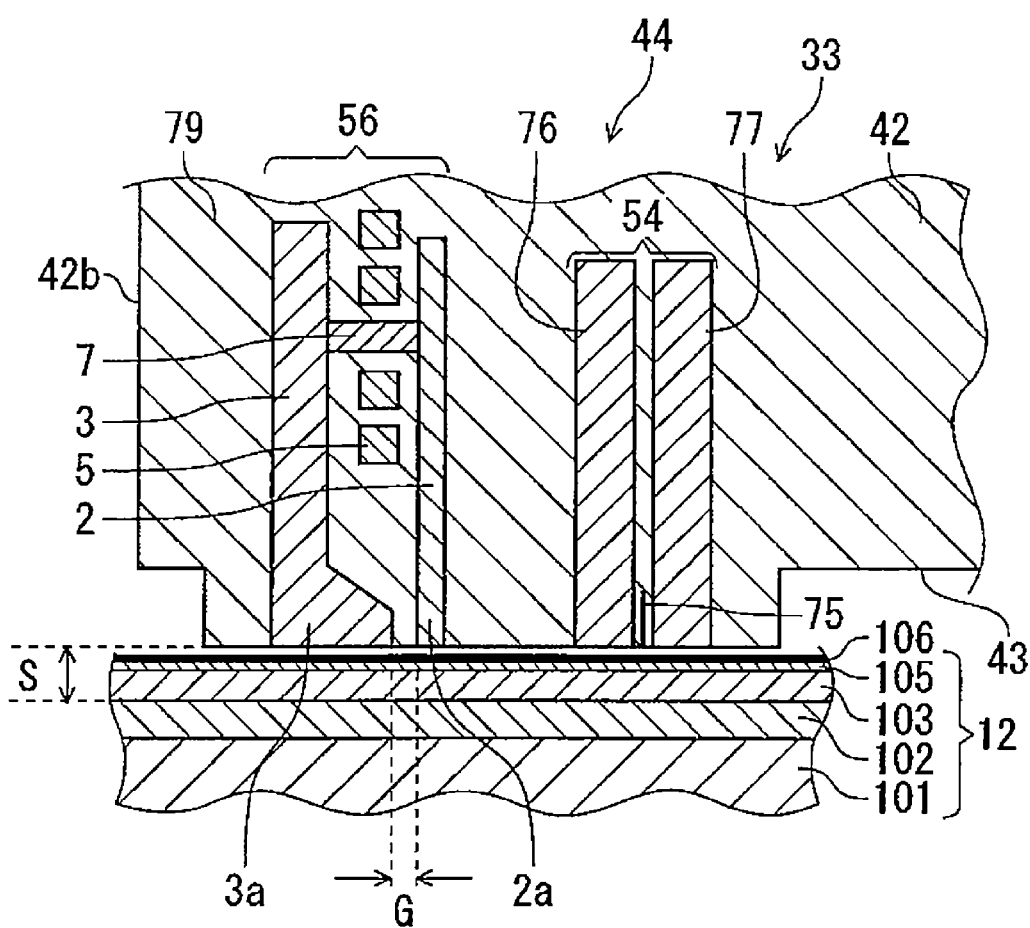
FIG. 6 is an enlarged sectional view of a head portion of a magnetic head and part of a magnetic disk of an HDD according to a second embodiment.

FIG. 6 is an enlarged sectional view of the head portion 44 of a magnetic head 33 and part of a magnetic disk 12A of an HDD according to a second embodiment.

The magnetic disk 12A according to this embodiment is a vertical two-layer film medium in which a soft magnetic layer 102 is formed on a substrate 101, a perpendicular recording layer 103 having such magnetic anisotropy that magnetic moment tends to be directed to the direction that is perpendicular to the disk surface is formed on the soft magnetic layer 102, a non-magnetic layer 105 mixed with soft magnetic fine particles is formed on the perpendicular recording layer 103, and another non-magnetic layer 106.

The magnetic head 33 is a recording/reproduction separation type magnetic head in which a recording head 56 and a reproduction head 54 are separated from each other. The recording head 56 is composed of a main magnetic pole 2 made of a high permeability material; a return yoke which is formed by a return magnetic pole 3 provided on the trailing side of the main magnetic pole 2 to efficiently close the magnetic path via the portion, right under the main magnetic pole 2, of the soft magnetic layer 102, a return shield 3a, and a joining portion 7 disposed on the side that is opposite to the surface of the magnetic disk 12A; and a coil 5 which is wound around a magnetic core including the main magnetic pole 2 and the return yoke to cause magnetic flux to flow through the main magnetic pole 2.

The reproduction head 54 is composed of a magnetic film 75 which exhibits a magnetoresistive effect and a first shield 76 and a second shield 77 which are made of a high permeability material and disposed on both sides of the magnetic film 75 in the head running direction.

To increase the resolution of recording on the portion, in the vicinity of the trailing end of the main magnetic pole 2, of the magnetic disk 12A, the distance G between the main magnetic pole 2 and the return shield 3a of the recording head is set shorter than the distance S between the ABS (air-bearing-slider) surface of the magnetic head 33 and the surface of the soft magnetic layer 102 of the magnetic disk 12A.

As described above, the invention can provide a perpendicular magnetic recording medium which allows even a narrow-track recording head to generate a magnetic field strong enough for writing and can realize a superior overwrite (OW) characteristic and a high resolution while suppressing physical deterioration of the head and the medium, as well as a magnetic disk device having such a perpendicular magnetic recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A perpendicular magnetic recording medium comprising:
   a substrate;
   an undercoat layer formed on the substrate and comprising a soft magnetic material;
   a recording layer formed on the undercoat layer and having an easy axis of magnetization in a direction that is approximately perpendicular to a surface of the perpendicular magnetic recording medium; and
   a protective layer which is formed on the recording layer and in which soft magnetic particles are mixed,
   wherein the soft magnetic particles are mixed in the protective layer and have a charging ratio that is less than or equal to 30%.

2. A perpendicular magnetic recording medium comprising:
   a substrate;
   an undercoat layer formed on the substrate and comprising a soft magnetic material;
   a recording layer formed on the undercoat layer and having an easy axis of magnetization in a direction that is approximately perpendicular to a surface of the perpendicular magnetic recording medium; and
   a protective layer which is formed on the recording layer and in which soft magnetic particles are mixed,
   wherein the protective layer is formed by mixing cobalt-zirconium-niobium particles into a carbon film.

3. A magnetic disc device comprising:
   a perpendicular magnetic recording medium comprising:
      a substrate,
      an undercoat layer formed on the substrate and comprising a soft magnetic material, a recording layer formed on the undercoat layer and having an easy axis of magnetization in a direction that is approximately perpendicular to a surface of the perpendicular magnetic recording medium, and a protective layer which is formed on the recording layer and in which soft magnetic particles are mixed; and a perpendicular magnetic recording magnetic head comprising:

a main magnetic pole for applying a magnetic field to the perpendicular magnetic recording medium perpendicularly to it, and a return yoke for receiving return magnetic flux coming from the perpendicular magnetic recording medium;

wherein a distance between the main magnetic pole and the return yoke is shorter than a distance between the main magnetic pole and the undercoat layer of the perpendicular magnetic recording medium.

4. The magnetic disk device according to claim 3, wherein the protective layer is formed by mixing the soft magnetic particles into a non-magnetic film.

5. The magnetic disk device according to claim 3, wherein the soft magnetic particles are mixed in the protective layer and have a charging ratio that is less than or equal to 30%.

6. The magnetic disk device according to claim 3, wherein the protective layer is formed by mixing cobalt-zirconium-niobium particles into a carbon film.

\* \* \* \* \*